(12) United States Patent
Giuliani et al.

(10) Patent No.: US 10,455,754 B2
(45) Date of Patent: Oct. 29, 2019

(54) SAFETY CLUTCH FOR AN AGRICULTURAL VEHICLE OR TRAILED ACCESSORY THEREOF

(71) Applicant: CNH Industrial America LLC, New Holland, PA (US)

(72) Inventors: Enrico Giuliani, Russi (IT); Xavier Bonte, Zuidzande (NL)

(73) Assignee: CNH Industrial America LLC, New Holland, PA (US)

( * ) Notice: Subject to any disclaimer, the term of this patent is extended or adjusted under 35 U.S.C. 154(b) by 27 days.

(21) Appl. No.: 15/727,294

(22) Filed: Oct. 6, 2017

(65) Prior Publication Data

US 2018/0098480 A1   Apr. 12, 2018

(30) Foreign Application Priority Data

Oct. 6, 2016   (BE) .................................. 2016/5746

(51) Int. Cl.
*A01B 61/02*   (2006.01)
*F16D 7/08*   (2006.01)
(Continued)

(52) U.S. Cl.
CPC ............ *A01B 61/025* (2013.01); *A01B 71/06* (2013.01); *A01F 15/085* (2013.01); *A01F 21/00* (2013.01);
(Continued)

(58) Field of Classification Search
CPC ....... A01B 61/02; A01B 61/025; A01B 71/06; A01F 21/00; A01F 15/085; F16D 43/208;
(Continued)

(56) References Cited

U.S. PATENT DOCUMENTS

| | | | | |
|---|---|---|---|---|
| 998,615 A | * | 7/1911 | Huneke | ............... F16D 43/2024 |
| | | | | 192/56.53 |
| 3,132,730 A | * | 5/1964 | Dahlstrand | ......... F16D 43/2028 |
| | | | | 192/56.51 |

(Continued)

FOREIGN PATENT DOCUMENTS

| | | |
|---|---|---|
| DE | 441218 A1 | 5/1996 |
| EP | 2068027 A1 | 6/2009 |
| FR | 2316476 A1 | 1/1977 |

*Primary Examiner* — Jacob S. Scott
*Assistant Examiner* — James J Taylor, II
(74) *Attorney, Agent, or Firm* — Peter K. Zacharias; Patrick M. Sheldrake

(57) ABSTRACT

A clutch for an agricultural implement including a rotating unit for connection to a powered shaft, a selectively disengageable unit, a zero-backlash torque limiter operable in an engaged position where a biased plunger is housed in a seat to angularly connect the rotating unit and the selectively disengageable unit for torque transfer until a maximum torque level is reached; and in a disengaged position where the plunger is retracted outside the seat. Further, a safety occlusion mechanism having an obstructing element selectively movable in an obstructing position to hinder the seat from housing the plunger and in a release position to allow shape coupling when the plunger and the seat overlap. The occlusion mechanism is biased to switch in the obstructing position and the release position is instated by an operator.

20 Claims, 8 Drawing Sheets

(51) Int. Cl.
*F16D 7/10* (2006.01)
*F16D 43/206* (2006.01)
*F16D 43/208* (2006.01)
*A01F 21/00* (2006.01)
*A01B 71/06* (2006.01)
*A01B 61/04* (2006.01)
*A01F 15/08* (2006.01)

(52) U.S. Cl.
CPC .............. *F16D 7/08* (2013.01); *F16D 7/10* (2013.01); *F16D 43/206* (2013.01); *F16D 43/208* (2013.01); *A01B 61/046* (2013.01)

(58) Field of Classification Search
CPC . F16D 43/206; F16D 7/06; F16D 7/08; F16D 7/10
See application file for complete search history.

(56) References Cited

U.S. PATENT DOCUMENTS

| | | | | |
|---|---|---|---|---|
| 3,405,790 | A | * | 10/1968 | Fortune ................. F16D 43/206 192/56.54 |
| 4,075,873 | A | * | 2/1978 | Geisthoff .............. F16D 43/206 192/56.57 |
| 4,142,616 | A | * | 3/1979 | Dekoninck ........... F16D 43/206 192/56.54 |
| 4,220,230 | A | * | 9/1980 | Hansen ................. F16D 43/206 192/56.57 |
| 4,798,559 | A | * | 1/1989 | Maurer ............... F16D 43/2026 192/56.56 |
| 5,868,231 | A | | 2/1999 | Kämpf |
| 6,749,049 | B2 | | 6/2004 | Kampf et al. |
| 6,799,666 | B2 | | 10/2004 | Kämpf |
| 8,668,065 | B2 | * | 3/2014 | Kampf ..................... F16D 7/08 192/12 B |

* cited by examiner

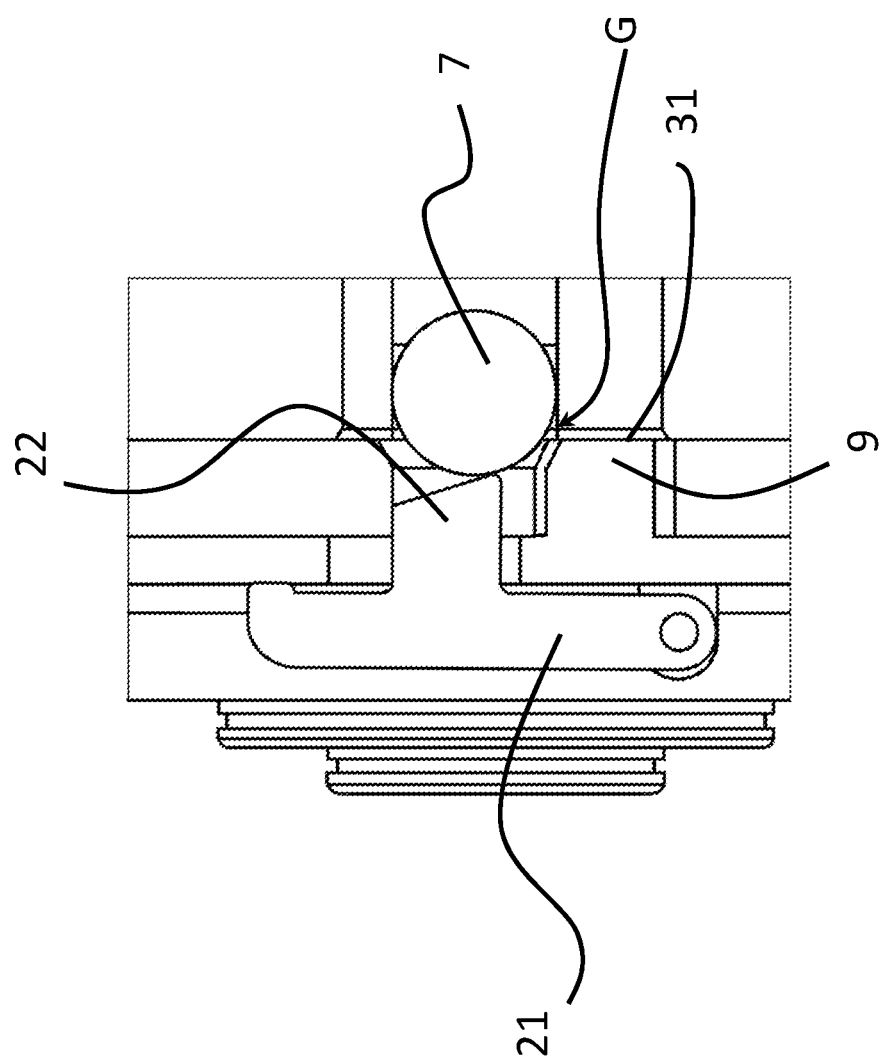

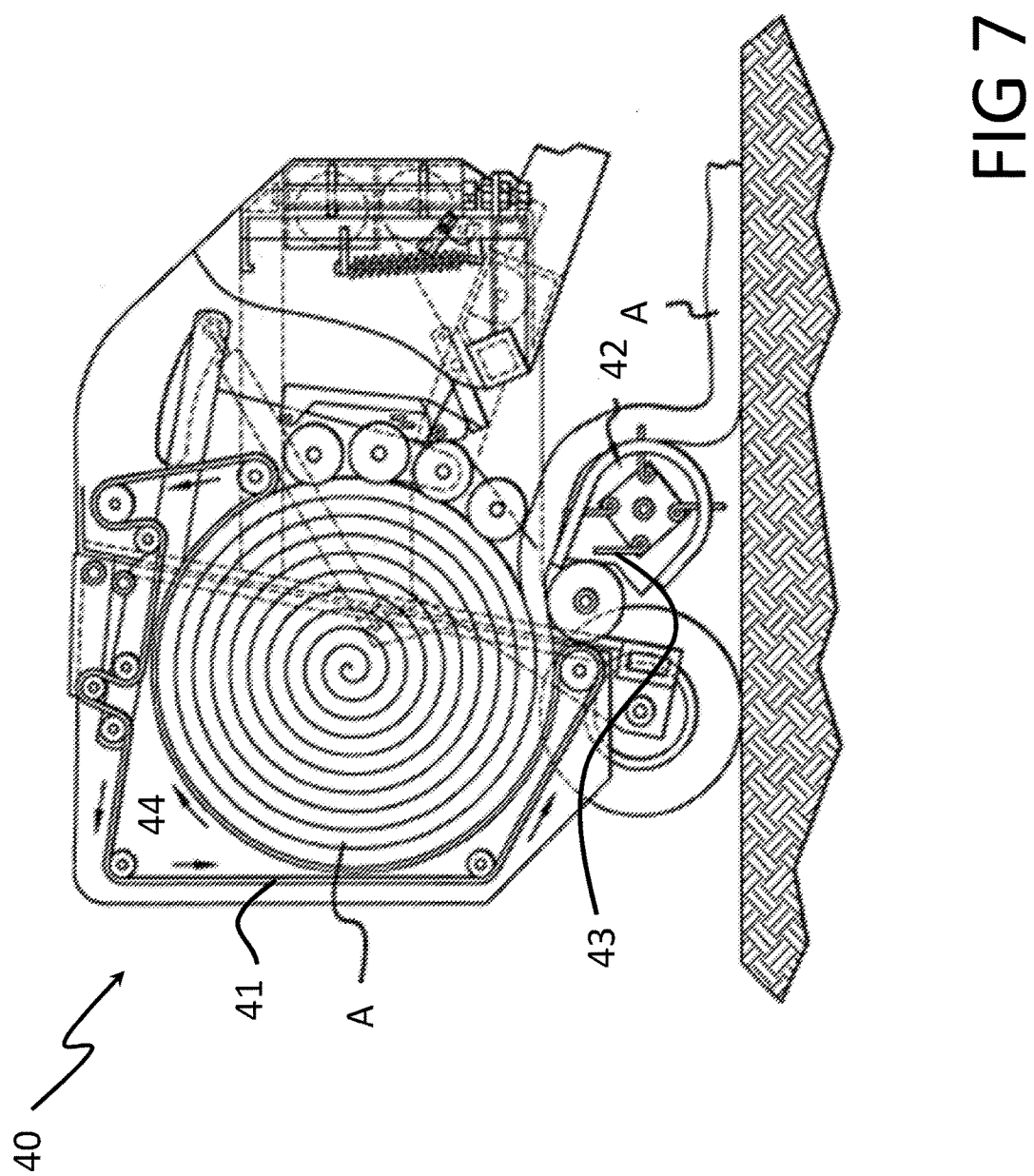

SAFETY CLUTCH FOR AN AGRICULTURAL VEHICLE OR TRAILED ACCESSORY THEREOF

FIELD OF THE INVENTION

The present invention relates to a safety clutch for an agricultural vehicle or for a trailed accessory attached to an agricultural vehicle, in particular to power an implement.

According to the present specification, an implement can be attached to the agricultural vehicle, e.g. a pick-up, or on a power accessory or machine trailed by a tractor and powered by the PTO of the tractor, e.g. a baler.

BACKGROUND OF THE INVENTION

Safety of an agricultural vehicle operator is a key issue. In particular, it is important to avoid that rotating shafts, that may be accessible by the operator in case of blockage by the crop or the like, may injure arms, legs or hands when the operator approaches the implement or the trailed machine to remove the cause of the blockage. A safety procedure prescribes that the driving shaft or the PTO shall be disconnected from the traction engine or the power hydraulic power source of the vehicle before the operator is able to approach the blocked implement or trailed machine.

It is known to provide a torque limiter to automatically disconnect torque transmission from the driving shaft of an implement or of a trailed machine when the implement or accessory is blocked e.g. by crop and the operator is driving the vehicle. The torque limiter sets a maximum torque level to be transmitted to the implement or trailed accessory and this avoids that blockage may damage the vehicle or the trailed accessory or both.

Sometimes the operator approaches a blocked implement or trailed machine to remove the cause of blockage, e.g. an obstruction, but the driving shaft of the implement or the PTO attached to the trailed accessory is still running.

Known torque limiters are such that re-engagement is dependent on torque level, i.e. re-engagement occurs when the torque drops below the pre-defined maximum level. This is normally the case when the operator removes the obstruction and the PTO or the driving shaft are not switched off. Sudden re-engagement of the torque limiter may cause severe injuries to the operator if the latter removes the obstruction using his/her feet, hands, arms etc. because the implement or the trailed accessory will immediately start to work again as soon as the torque limiter is re-engaged.

Even in case the PTO is disconnected or the driving shaft is not driven by the traction motor during removal of crop plug, power transmission via torque limiter may be inadvertently started too early. This may be a risk in case the operator is very close to the implement.

In FR 2 316 476, an automatically declutchable drive coupling is described having driving and driven parts. The driven part having inserts whose ends cooperate with ramp surfaces in the driving part. Rollers act as a bearing between the driving and driven parts. A helical spring acts on the inserts through a compression ring. A clutching mechanism for the coupling has inclined zones cooperating with corresponding parts on the inserts, whereby the clutching movement being against the action of a second spring.

In US 2003/136625 a torque limiting coupling is shown having a coupling hub with circumferentially distributed apertures. A switching disk is rotatably arranged between a coupling position and an uncoupling position. The switching disk is loaded towards the coupling position and loads driving members towards the coupling hub. When a torque limit is exceeded, the driving members are transferred into the uncoupling position. A locking means is adjustable between a locking position, where the switching disk is locked in its uncoupling position, and a disengaging position. A retainer is adjustable between a retaining position, where the locking means is secured in its disengaging position, and a releasing position. A detent pawl is movable between a neutral position and a disconnecting position. In the disconnecting position, the detent pawl transfers the switching disk into the uncoupling position. In the disconnecting position, the detent pawl transfers the retainer into the retaining position.

DE 44 41 218 discloses a torque limiting clutch comprising a casing, hub and followers. The clutch is adjustable between a torque transfer and a declutching position. An engaging ring acts on balls, engaging the followers radially inwards in the torque transfer position. If the balls move outwards in the declutching position, they are pressed radially inwards until the ring can slide over them. The ring sliding secures the balls against radially outwards motion by a bore section, thus facilitating the entry of the followers into the recesses and into the torque transfer position with the relative rotation of the clutch hub and casing.

SUMMARY OF THE INVENTION

The scope of the present invention is to provide a safety clutch that solves the above mentioned problems.

The scope of the present invention is achieved by a clutch that, once disconnected because of torque peak due to an obstruction, is re-engaged only upon a specific intentional operation from the operator.

This is in particular achieved by a clutch according to claim 1.

Other embodiments of the invention are described below and in the appended claims.

BRIEF DESCRIPTION OF THE DRAWINGS

For a better understanding of the present invention, the latter will further be disclosed with reference to the accompanying figures in which:

FIGS. 4, 5 and 6 are respective enlarged views of a detail of FIG. 1;

FIG. 7 is a schematic drawing of a conventional trailed baler comprising a safety clutch according to the present invention;

DETAILED DESCRIPTION OF THE DRAWINGS

Figure 1:
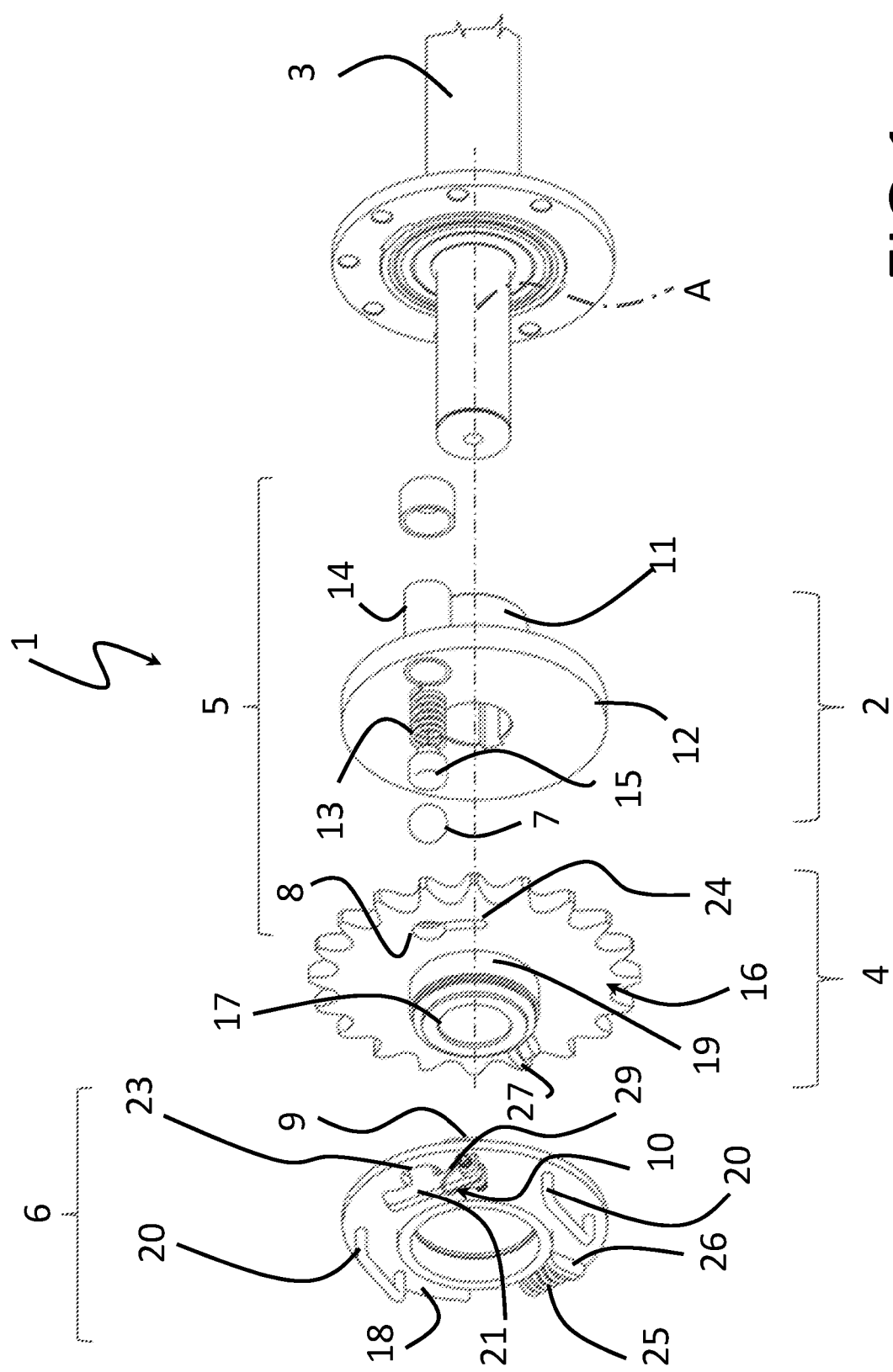
FIG. 1 is an exploded view of a clutch according to the present invention.

FIG. 1 refers, as a whole, to a safety clutch 1 comprising a rotating unit 2 angularly connected to a shaft 3, and a selectively disengageable unit 4 coaxial to rotating unit 2 and suitable for powering a device that may be blocked during use, e.g. by an obstruction of crop. Safety clutch 1 further comprises a zero backlash torque limiter 5 operating to angularly connect rotating unit 2 and selectively disengageable unit 4 for torque transfer and operation of an agricultural implement or trailed agricultural accessory until a maximum torque level is reached. Safety clutch 1 also comprises a safety occlusion mechanism 6 interacting with torque limiter 5 to maintain angular disengagement of rotating unit 2 from selectively disengageable unit 4 as soon as the maximum torque level is exceeded in use.

In particular, torque limiter 5 comprises a biased plunger 7 releasably coupled in a seat 8 to provide a shape coupling for torque transferring between rotating unit 2 and selectively disengageable unit 4 in normal use of clutch 1. Occlusion mechanism 6 comprises an obstructing element 9 movable between an obstructing position where seat 8 is engaged by obstructing element 9 and a release position where seat 8 is engaged by plunger 7 for torque transfer. In particular, when occlusion mechanism 6 is in the obstruction position, selectively disengageable unit 4 is blocked by the crop plug whilst rotating unit 2 may still rotate. In such a condition, plunger 7 cannot enter seat 8. In particular, rotating unit 2 and selectively disengageable unit 4 relatively rotate in both directions when occlusion mechanism 6 is in the obstruction position.

In order to have the clutch re-engaged, the operator shall act so as to bring obstructing element 9 in the release position. Then, when torque is applied to clutch 1, plunger 7 will find an un-obstructed seat 8, will be biased to enter seat 8 and this will re-instate torque transfer through clutch 1.

According to a preferred embodiment, safety occlusion mechanism 6 is biased to reach and maintain obstructing position. Therefore, as soon as maximum torque level is exceeded, plunger 7 retracts and angularly moves out of seat 8 and the latter is engaged by obstructing element 9.

Furthermore, safety occlusion mechanism 6 comprises a releasable retainer 10 to keep release position after the operator has acted to remove obstructing element 9 from seat 8 and until plunger 7 reaches the seat itself via relative rotation of rotating unit 2 and selectively disengageable unit 4.

In order to provide an automatic engagement of plunger 7 in seat 8 when retainer 10 holds the release position of obstructing element 9, the load acting on biased plunger 7 when the latter enters seat 8 is such to disengage releasable retainer 10. According to a preferred embodiment, retainer 10 is biased to enter in seat 8 when keeping the release position of the safety occlusion mechanism 6; and plunger 7, upon entering seat 8 during re-engagement, pushes retainer 10 out of seat 8.

According to the preferred embodiment of FIG. 1, rotating unit 2 comprises a hub 11 connectable to shaft 3 and a flange 12 radially projecting from hub 11. Preferably hub 11 is keyed to shaft 3 but other angularly rigid connections are possible depending on use.

Clutch 1 is also designed so that plunger 7 is driven in rotation by rotating unit 2. Seat 8 forms part of the selectively disengageable unit 4. Preferably, plunger 7 moves to engage seat 8 along a direction substantially parallel to an axis A of rotating unit 2 and is biased by a coil spring 13. Coil spring 13 is housed in a sheath 14 projecting axially from flange 12 and offset from hub 11. Depending on the case, sheath 14 may be skew with respect to hub 11 or parallel to hub 11, the latter layout being shown in FIG. 1. Sheath 14 houses a pad 15 axially interposed between plunger 7 and coil spring 13. Sheath 14 guides the axial movement of plunger 7, which is preferably spherical, and pad 15.

Selectively disengageable unit 4 comprises a sprocket 16 connectable to a chain for torque transmission to e.g. a pick-up device of a baler, and is radially supported on shaft 3 by a journal bearing 17. Depending on the use of clutch 1, sprocket 16 may be substituted by a pulley, a gear or another torque-transmitting element and/or journal bearing may be substituted by a rolling bearing.

According to the embodiment of FIG. 1, safety obstruction mechanism 6 comprises a rotating disk 18 radially supported on a collar 19 of sprocket 16, and one or more handles 20 to help rotation of disk 18 by the operator. Obstructing element 9 is a tooth axially projecting from disk 18 on an opposite side of handles 20 and retainer 10 comprises a pivoting arm 21 hinged on disk 18. In particular, arm 21 comprises a head 22 (FIG. 2) movable inside a hole 23 of disk 18 so as to be adjacent to tooth 9 along a circumferential direction. Furthermore, tooth 9 is housed in a slot 24, preferably an arched slot, branching from seat 8 so that, when disk 18 rotates relatively to sprocket 16, tooth 9 moves away or towards seat 8.

Safety occlusion mechanism 6 further comprises a spring 25, preferably a coil spring, to angularly bias disk 18 in the direction so that tooth 9 is kept inside seat 8, i.e. the obstructing positon of occlusion mechanism 6. According to a preferred embodiment, spring 25 is compressed between a stop 26 of disk 18 and a stop 27 of sprocket 16.

Figure 2:
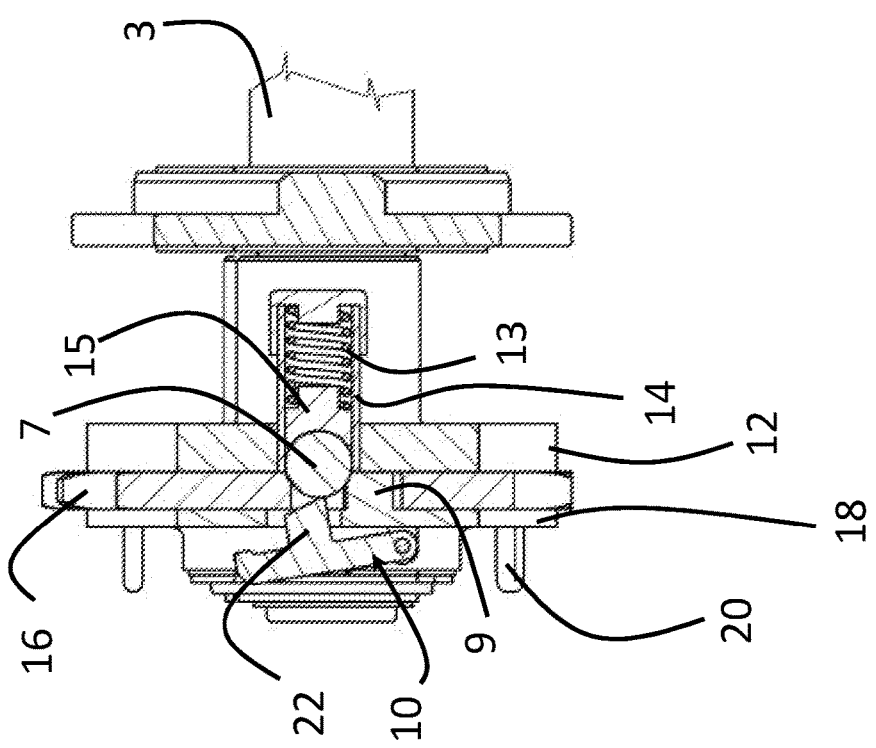
FIG. 2 is a cross section of FIG. 1 in a plane offset from axis A of FIG. 1.

FIG. 2 shows the engagement position of clutch 1. In particular, plunger 7 is shape-coupled in seat 8 and torque is transferred through plunger 7, in particular producing shear forces in plunger 7. Tooth 9 do not engage seat 8 and the action of spring 13 on plunger 7 is such to keep head 22 lifted so that there is no compression of spring 25 by means of retainer 10. Furthermore, action of spring 13 is such to counterbalance the load of spring 25 so as to keep tooth 9 outside seat 8 when, during engagement of clutch 1, plunger 7 is housed in seat 8. The engagement position according to FIG. 2 is such that proper torque levels are transferred during use of clutch 1 and rotating unit 2 is rotatingly coupled to selectively disengageable unit 4.

Figure 3:
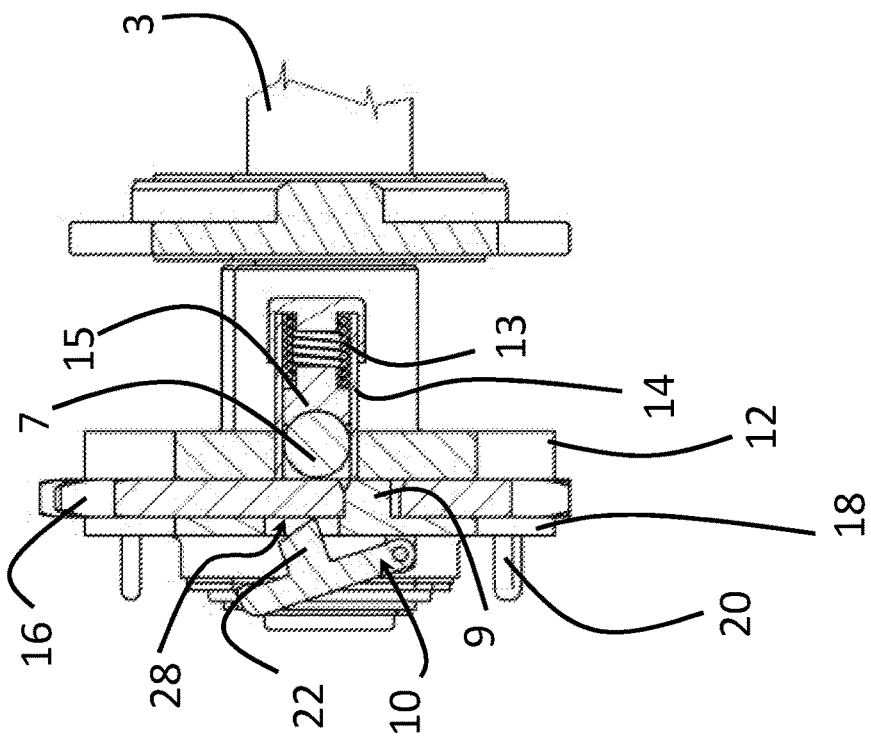
FIG. 3 is a cross section of FIG. 1 in the same plane as that of FIG. 2.

FIG. 3 shows a disengaged position of clutch 1. With respect to FIG. 2, plunger 7 is retracted from seat 8 against the action of spring 13; disk 18 is angularly rotated in the circumferential direction by means of spring 25 so that tooth 9 obstructs seat 8 and hinders re-entrance of plunger 7; and head 22 is more lifted and biased against a face or surface 28 of sprocket 16 opposed to rotating unit 2. In the disengaged position, the operator may safely act to remove the crop plug from e.g. the pick-up of a baler, because the pick-up, which is connected to sprocket 16 by a chain, is not powered anymore. Furthermore, the operator can grab and rotate the pick-up to help remove the plug. In case, e.g. after action of the operator on the pick-up, plunger 7 faces seat 8, tooth 9 obstructs coupling of the plunger inside seat 8 so that rotating unit 2 and selectively disengageable unit 4 can freely rotate in both directions one with respect to the other. In particular, tooth 9 is guided by disk 18 to move along a trajectory that is transversal, preferably perpendicular, to the action of spring 13 on plunger 7. According to the embodiment of the FIGS. 1 to 6, guiding of tooth 9 along its trajectory is provided by the rotating coupling between disk 18 and sprocket 16. This may be obtained, depending on the design working conditions, by a rolling bearing or by a friction bushing or journal bearing.

Figure 5:
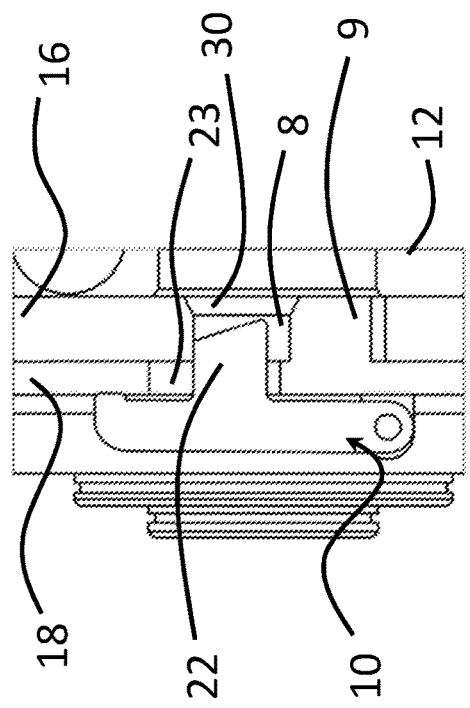
Figure 4:
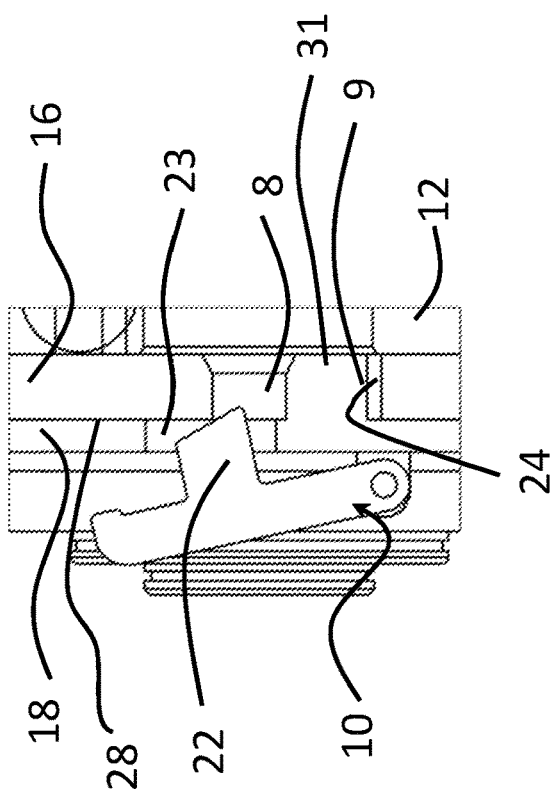

FIGS. 4 and 5 show a sequence of phases to bring again clutch 1 from the disengaged position of FIG. 3 to the engaged position of FIG. 2.

In particular, FIG. 4 shows the consequence of an incipient rotation of disk 18 by the operator when holding handles 20 to intentionally move tooth 9 out of seat 8 against the action of spring 25. Gradually, tooth 9 moves back inside slot 24 and head 22 fully overlaps seat 8 sliding on face 28.

FIG. 5 shows the condition where tooth 9 has completely released seat 8 and is housed in slot 24 after occlusion mechanism 6 has rotated with respect to selectively disengageable unit 4. Head 22 is fully overlapped on seat 8 and, due to the biasing action of a spring 29, moves down and snaps into seat 8 to rest against sprocket 16 along the circumferential direction. Abutment of head 22 against sprocket 16 is kept by the action of spring 25 to define a retaining position of retainer 10. In such a condition, an extraction position of tooth 9 from seat 8 is kept while plunger 7 is outside seat 8. Furthermore, in such a condition, the operator can release handles 20 and retainer 10 keeps the angular position such that tooth 9 is out of seat 8. In the retaining position, tooth 9 is circumferentially spaced from plunger 7 via a gap G (see FIG. 6).

According to a preferred safety procedure, the operator shall switch the PTO off as soon as he or she understands that pick-up is disconnected from the PTO because the safety clutch 1 automatically switched in the disengaged position. When safety clutch 1 comprises handles 20 according to FIG. 1, disconnection of the PTO is the safest possible condition to guarantee that hands of the operator are not hurt when he or she grabs handles 20 and rotates disk 18 so that tooth 9 moves out from seat 8 and spring 25 is kept in a compressed state via arm 10 engaging seat 8.

As soon as plunger 7 rotates with respect to sprocket 16 while retainer 10 is engaged, e.g. because the operator has powered again shaft 3 by means of the PTO, seat 8 will at one point again fully overlap plunger 7. In such an instance, plunger 7 contacts head 22 and action of spring 13 overcomes the action of spring 29. This lifts head 22 out of abutment against sprocket 16. As soon as head 22 is out of abutment against seat 8 along the circumferential direction, tooth 9 will close gap G by means of spring 25 and head 22 is circumferentially displaced out of seat 8. In particular, head 22 moves away from slot 24 when spring 25 closes gap G. As shown in FIG. 2, in the engaged position of clutch 1, head 22 is prevented from snapping into seat 8 when the maximum torque limit is reached and plunger 7 retracts away from seat 8 to disengage clutch 1. This is because, in such a condition, head 22 and seat 8 are misaligned. Furthermore, the action of spring 13 is such to couple again plunger 7 in seat 8 against the action of spring 29. It is important to note that, albeit rotating element 2 and selectively disengageable unit 4 relatively rotate in both directions of rotation when clutch 1 is disengaged, rotation for torque transmission in use is always in a single direction of rotation. To this regard, tooth 9 enters seat 8 along the single direction of rotation and gap G is closed after a rotation in such single direction.

Preferably, during closure of gap G, head 22 lifts in such a way that head 22 is misaligned with seat 8. By means of an inclined surface a first portion of head 22 still faces seat 8 and a second portion of head 22 faces surface 28. According to the embodiment of the FIGS. 1 to 6, head 22 is inclined. According to a non-illustrated alternative, face 28 comprises a ramp on which head 22 slides to progressively lift out of seat 8 when retainer 10 moves away from slot 24. In the engaged position of clutch 1, head 22 may either contact an edge of seat 8 or be lifted from such an edge because of contact with plunger 7.

When clutch 1 is engaged and torque is transferred, plunger 7 is partly housed in sheath 14 and partly contacts a chamfered edge 30 of seat 8. The inclination of chamfered edge 30 is such to properly load plunger 7 to transmit torque until the maximum threshold is reached. When this happens, chamfered edge 30 applies on plunger 7 a load having a component that is parallel to the action of spring 13. The magnitude of such a component depends on the inclination of chamfered edge 30. If torque tends to further increase, the component parallel to axis A increases as well and this will cause compression of spring 13 to cause retraction of plunger 7 and disengagement of clutch 1. Therefore, preload of spring 13 sets the maximum level of torque transmitted by clutch 1.

In case, by chance, plunger 7 is contacting tooth 9 and fully overlaps seat 8 when the operator has removed the blockage and decides to move occlusion mechanism 6, upon exit of tooth 9 from seat 8, plunger 7 would enter seat 8 and lift retainer 10 so that the latter is immediately disengaged from seat 8, as already mentioned in the above paragraphs.

When clutch 1 disengages after the maximum torque level is reached, torque transmitted even in case of continuing rotation of rotating element 2 is negligible and can be reduced to friction torque of rotating element 2 sliding against selectively disengageable unit 4. Furthermore, in view of interference caused by circumferential misalignment of head 22 and seat 8 in the engaged position of clutch 1, when plunger 7 retracts and tooth 9 rotates in the single direction into seat 8, head 22 is prevented from snapping into seat 8 and slides away from seat 8 on face 28 along the circumferential direction.

In the disengaged position of clutch 1, ideally there is no torque transmitted even in case rotating element 2 still rotates, except for the very low torque due to friction. This is obtained in particular if tooth 9 is shaped to contact plunger 7 during rotation of rotating element 2 and supports plunger 7 so that spring 13 does not substantially extend or compress during a complete route of rotating element 2. According to the embodiment of FIGS. 1 to 6, plunger 7 rolls on a substantially flat face of sprocket 16 and a head 31 of tooth 9 is substantially coplanar with such a face. Furthermore, according to the embodiment of the figures, slot 24 and head 31 have a radial position to overlap a rolling path of plunger 7 on sprocket 16. Preferably, also radial width of slot 24 is such that, when plunger 7 rolls on slot 24, spring 13 does not substantially extend or compress.

FIG. 7 schematically shows a trailed baler 40 powered by the PTO of a tractor (not shown). Power from the PTO drives a gearbox (not shown) connected to a plurality of driven functional units, such as a compacting device preferably comprising belts 41, and a pick-up or feeder 42 comprising a plurality of tines 43 movable in a predetermined path to lift crop material from the ground and deliver it towards a compacting chamber 44 of baler 40. Preferably pick-up 42 is in series to compacting device with respect to the gearbox. In particular, torque transfer from PTO to functional units is provided with a speed reduction in order to increase torque available to the functional units. Safety clutch 1 can be placed in any position along the torque path on the baler, depending on the intended use. Preferably, safety clutch 1 is in series between either the functional unit or the gearbox and pick-up 42.

The above applies as well to implements on board of an agricultural vehicle, including the PTO.

A clutch according to the present invention has the following advantages.

Clutch 1 is re-engaged only when the operator intentionally acts on occlusion mechanism 6 to remove tooth 9 from seat 8. Even in case the driving shaft or the PTO are still running, there is no automatic re-engagement of clutch 1 upon removal of the blockage. According to a preferred safety procedure, the PTO needs to be stopped completely before the operator will be able to reposition the occlusion mechanism 6 via handles 20 to make re-engagement of the clutch 1 possible.

Furthermore, gap G ensures that, after release of the retaining position of head 22, clutch 1 re-engages and is fully reset in order to disengage in case of e.g. obstruction of the pick-up by a plug of crop.

Plunger 7 stops tooth 9 and safety occlusion mechanism 6 is biased in order to swiftly push tooth 9 into seat 8 when plunger 7 retracts after the maximum torque level is reached. This is an embodiment of a zero-backlash torque limiter and ensures prompt disengagement of clutch 1.

Furthermore, other features of dependent claims are such to provide a simple and compact structure, which ensures functioning in the harsh conditions of agricultural vehicles.

It is clear furthermore that changes and variations are applicable to the clutch according to the present invention without departing from the scope of protection as defined in the attached claims.

Depending on the torque transmitted, it is possible to apply zero-backlash torque limiter 5 to function along a radial direction instead of the axial direction disclosed in the attached drawings.

Figure 8:
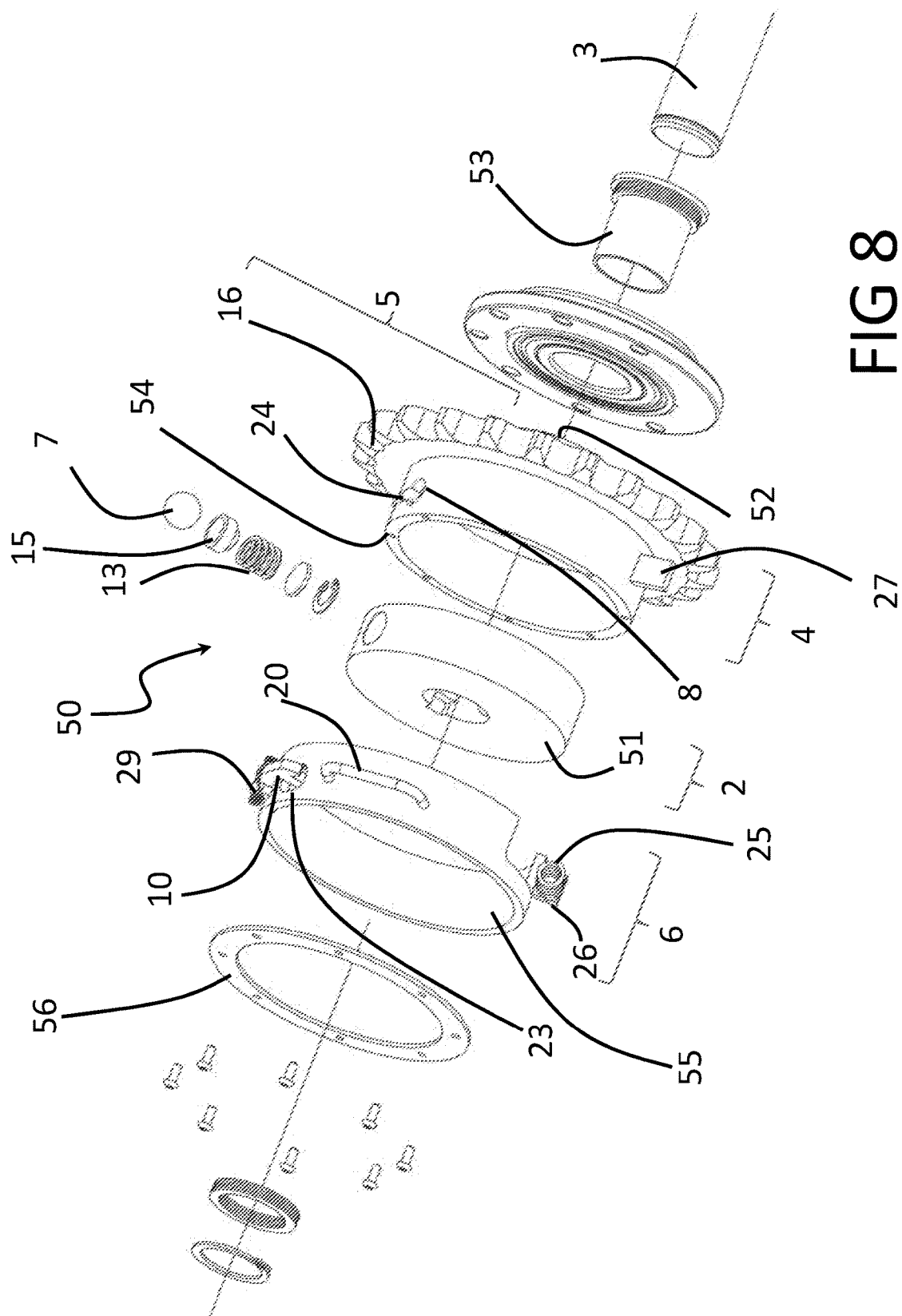
FIG. 8 is an exploded view of a clutch according to a second embodiment of the present invention.
Figure 9:
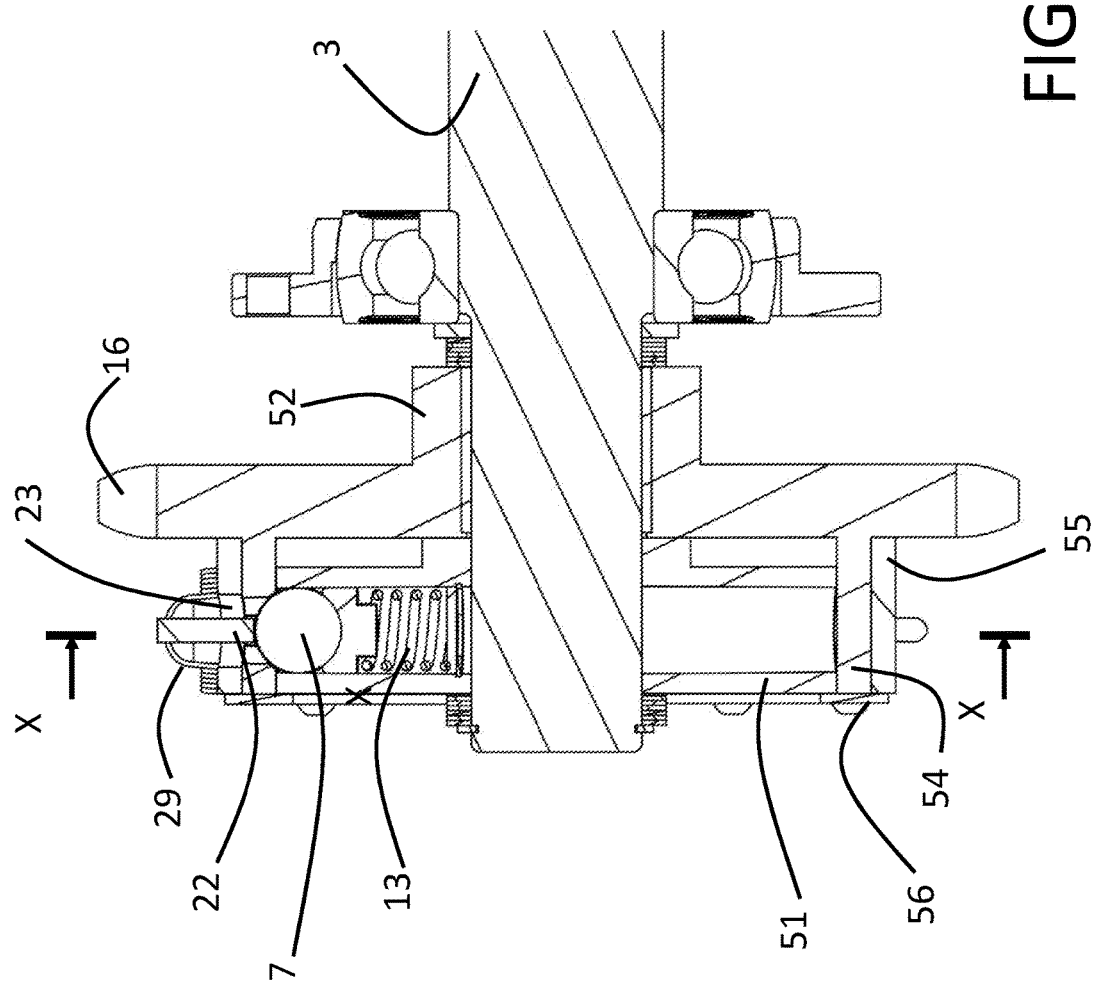
FIG. 9 is a cross section view along an axial plane, of the embodiment according to FIG. 8.
Figure 10:
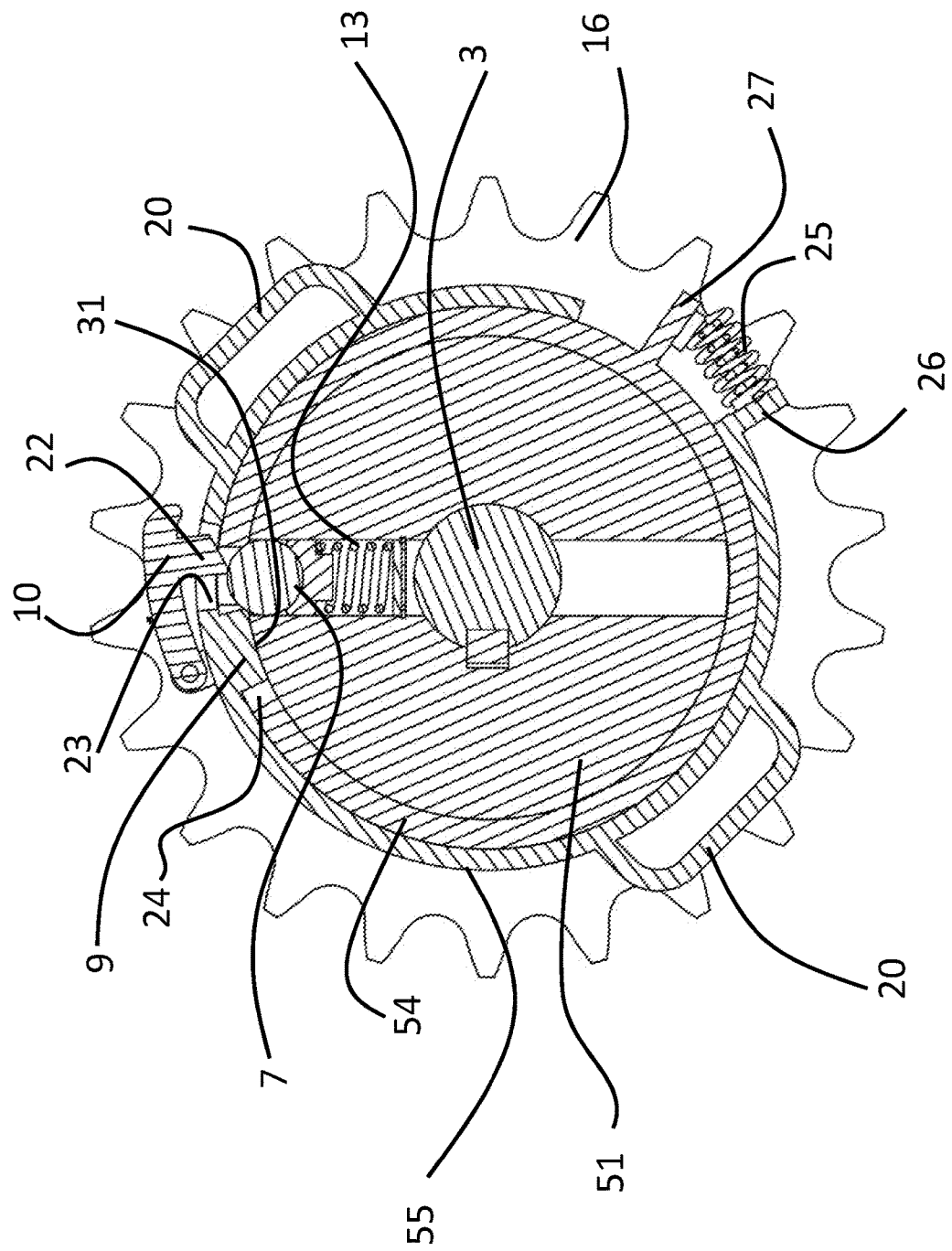
FIG. 10 is a cross section according to plane X-X of FIG. 9.

According to FIGS. 8-10, clutch 50 is a further embodiment of a safety clutch according to the present invention. Elements and components of clutch 50 that are functionally identical to those already described in the preceding paragraphs will maintain the same reference numeral.

Clutch 50 is configured to provide a radial layout of zero-backlash torque limiter 5, compared to the axial layout of safety clutch 1. In particular, rotating unit 2 comprises a housing 51 rotationally fixed to shaft 3. Preferably, housing 51 is a disk and houses spring 13, pad 15 and plunger 7. Furthermore, housing 51 defines a radial guide for plunger 7.

Sprocket 16 of selectively disengageable unit 4 comprises a hub 52 radially supported by shaft 3 via a bushing 53.

Seat 8 and slot 24 are radial and defined by a collar 54 rigidly connected to sprocket 16. Preferably sprocket 16 and collar 54 are a single body. Stop 27 radially projects from collar 54.

Safety obstruction mechanism 6 comprises a ring 55 radially supported by collar 54. Handles 20 project radially from ring 55 as well as stop 26 to press on spring 25.

Retainer 10 and spring 29 are attached to ring 55 as well so that head 22 reaches seat 8 through hole 23. The latter is radial and defined by ring 55.

Ring 55 is axially attached to disengageable unit 4 via a flange 56 so that ring 55 is axially interposed between flange 56 and sprocket 16. Preferably, flange 56 is attached to selectively disengageable unit 4, in particular to collar 54, via a plurality of screws.

The operator may act on handles 20 or another manual grip or hold provided on obstruction mechanism 6. As an alternative, the operator may operate a servo-mechanism to rotate obstruction mechanism 6 with respect to selectively disengageable unit 4 to have tooth 9 exit, i.e. along the circumferential direction, from seat 8 and, thus, have clutch 1 re-engaged.

The invention claimed is:

1. A clutch for an agricultural implement comprising:
a rotating unit for connection to a powered shaft;
a selectively disengageable unit coaxial to the rotating unit to transfer a power torque;
a zero-backlash torque limiter operable in:
an engaged position where a biased plunger is housed in a seat to angularly connect the rotating unit and the selectively disengageable unit for torque transfer until a maximum torque level is reached; and
a disengaged position where the plunger is retracted outside the seat; and
a safety occlusion mechanism having an obstructing element selectively movable between an obstructing position, in which the obstructing element blocks the plunger from entering the seat, and a release position, in which the obstructing element does not block shape coupling between the plunger and the seat when the plunger and the seat overlap; and
a biased retainer,
wherein the occlusion mechanism is biased by a spring to switch to the obstruction position when the plunger exits the seat to reach the disengaged position when the maximum torque level is reached, and is operable against the bias of the spring by an operator to switch back into the release position, and
wherein the biased retainer snaps into a retaining position to maintain a predefined extraction position of the obstructing element in the seat when the occlusion mechanism is operated by the operator against the bias of the spring and the plunger is outside the seat.

2. The clutch according to claim 1, wherein the retainer is released from the retaining position by the biased plunger when entering the seat and, after being released from the retaining position, the retainer is rotated by the bias of the occlusion mechanism to abut by overlap on a surface outside of the seat.

3. The clutch according to claim 2, wherein, in the engaged position, the plunger stops the obstructing element from entering the seat against an action of the biased occlusion mechanism.

4. The clutch according to claim 3, wherein the seat is a through hole in the selectively disengageable unit to selectively engage the plunger or retainer and wherein the plunger is opposite to the retainer with respect to the seat.

5. The clutch according claim 1, wherein the occlusion mechanism relatively rotates with respect to the selectively disengageable unit and comprises the retainer.

6. The clutch according to claim 1, wherein upon relative rotation of the rotating unit and the selectively disengageable unit in the disengaged position, the plunger rolls on a surface such that compression and elongation of the biased plunger are substantially null.

7. The clutch according to claim 1, wherein the obstructing element is such to enter the seat along a direction perpendicular to an action of the biased plunger when entering the seat.

8. The clutch according to claim 1, wherein the plunger is a roller.

9. The clutch according to claim 8, wherein the obstructing element is a tooth overlapping a rolling path of the plunger in the disengaged position.

10. The clutch according to claim 1, wherein the occlusion mechanism comprises a handle or a manual grip to extract the obstructing element from the seat.

11. The clutch according claim 1, wherein the plunger moves along a substantially axial direction to engage or disengage the seat.

12. The clutch according to claim 11, wherein the plunger is offset with respect to an axis of revolution of the rotating unit.

13. The clutch according to claim 11, wherein the obstructing element is housed in an arched slot.

14. The clutch according to claim 11, wherein the plunger contacts a substantially flat face of the selectively disengageable unit or a head of the obstructing element when the obstructing element is in the obstructing position.

15. The clutch according to claim 1, wherein the plunger moves along a substantially radial direction to engage or disengage the seat.

16. The clutch according to claim 15, wherein the plunger is housed in a disk of the rotating unit.

17. The clutch according to claim 15, wherein the obstructing element is housed in a radial slot.

18. The clutch according to claim 15, wherein the plunger contacts a collar of the selectively disengageable unit or a head of the obstructing element when the obstructing element is in the obstructing position.

19. An agricultural vehicle or trailed agricultural accessory comprising an implement driven via the clutch according to claim 1.

20. A method of operation of the clutch according to claim 1, comprising a step of operating the safety occlusion mechanism to switch back into the release position.

* * * * *